US009874300B2

(12) United States Patent
Hagen et al.

(10) Patent No.: US 9,874,300 B2
(45) Date of Patent: Jan. 23, 2018

(54) CONNECTING DEVICE FOR MEDIA LINES

(71) Applicant: VOSS Automotive GmbH, Wipperfürth (DE)

(72) Inventors: Harald Hagen, Wipperfürth (DE); Adrian Klehr, Neuenrade (DE)

(73) Assignee: VOSS AUTOMOTIVE GMBH, Wipperfürth (DE)

( * ) Notice: Subject to any disclaimer, the term of this patent is extended or adjusted under 35 U.S.C. 154(b) by 416 days.

(21) Appl. No.: 14/410,271

(22) PCT Filed: Jun. 18, 2013

(86) PCT No.: PCT/EP2013/062594
§ 371 (c)(1),
(2) Date: Dec. 22, 2014

(87) PCT Pub. No.: WO2014/001144
PCT Pub. Date: Jan. 3, 2014

(65) Prior Publication Data
US 2015/0337998 A1    Nov. 26, 2015

(30) Foreign Application Priority Data

Jun. 26, 2012 (DE) .................... 20 2012 102 342 U
Sep. 18, 2012 (DE) ......................... 10 2012 108 759

(51) Int. Cl.
*F16L 37/091*   (2006.01)
*F16L 37/098*   (2006.01)
*F16L 47/24*   (2006.01)

(52) U.S. Cl.
CPC ......... *F16L 37/0915* (2016.05); *F16L 37/091* (2013.01); *F16L 37/0985* (2013.01); *F16L 47/24* (2013.01)

(58) Field of Classification Search
CPC . F16L 37/0915; F16L 37/091; F16L 37/0985; F16L 47/24
(Continued)

(56) References Cited

U.S. PATENT DOCUMENTS 4,437,689 A * 3/1984 Goebel ................. F16L 33/223
4,471,978 A    9/1984 Kramer
(Continued)

FOREIGN PATENT DOCUMENTS

DE    43 05 609 A1    11/1993
DE    43 08 526 A1    9/1994
(Continued)

OTHER PUBLICATIONS

European Patent Office, International Search Report of International Application No. PCT/EP2013/062594, dated Sep. 23, 2013, 3 pages.

*Primary Examiner* — Gregory J Binda
*Assistant Examiner* — Zachary T Dragicevich
(74) *Attorney, Agent, or Firm* — Eirc J. Sosenko; Jonathan P. O'Brien; Honigman Miller Schwartz and Cohn LLP

(57) ABSTRACT

A connecting device for media lines, having a housing part, which is formed in two parts from a receiving part for plug connection of a media line and from a connecting part for connecting the housing part to a unit or an additional media line. The connecting part is connected to the receiving part via a coaxial rotationally symmetrical plug connection with form-fitting engagement and with a peripherally closed line progression. The connecting part is inserted with an insertion projection into a plug receptacle of the receiving part, wherein the insertion projection reaches with a radially
(Continued)

Figure 1:
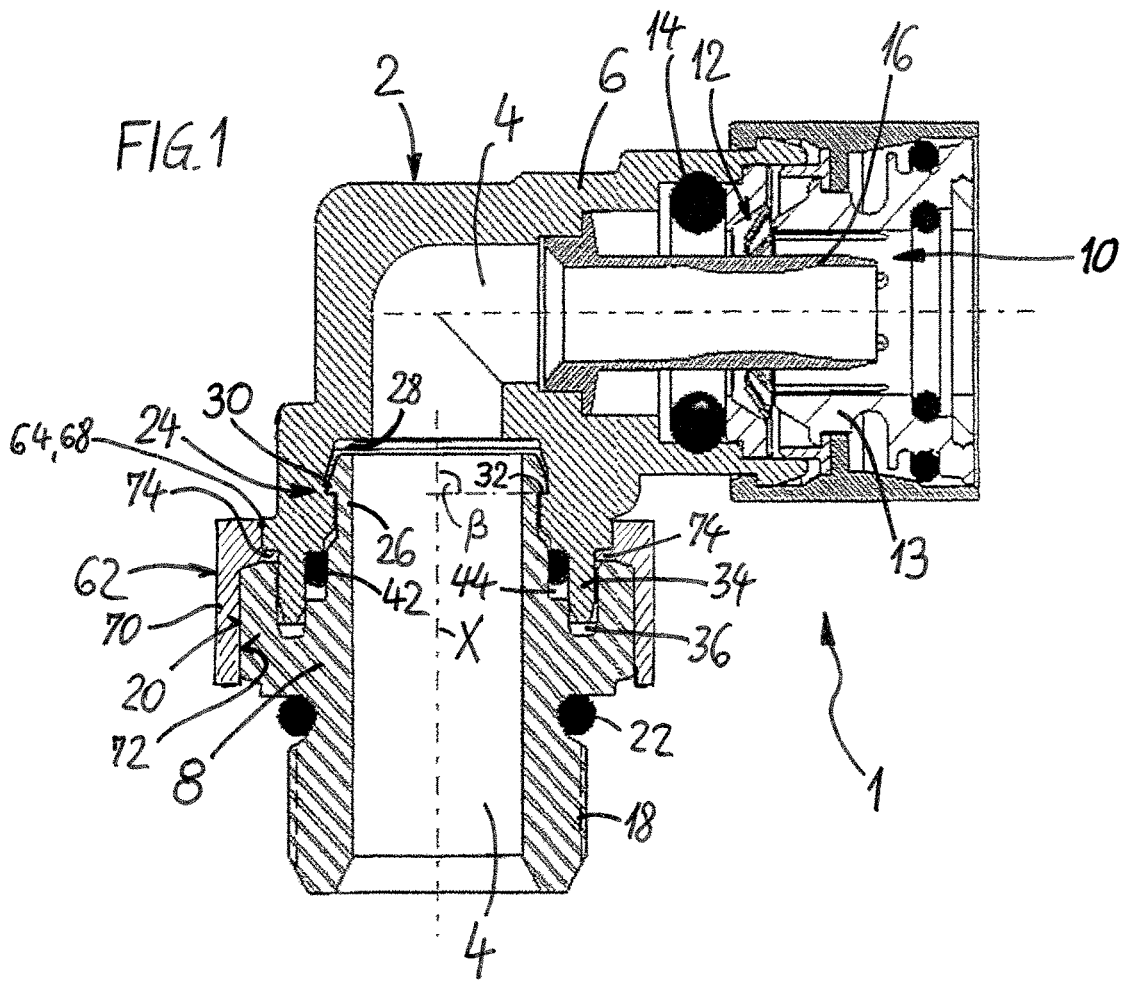

outward protruding catch step in a form-fitting manner behind a radial undercut surface inside of the plug receptacle.

13 Claims, 4 Drawing Sheets

(58) Field of Classification Search
USPC .................. 285/39, 340, 92, 275, 278, 331
See application file for complete search history.

(56) References Cited

U.S. PATENT DOCUMENTS

| | | | |
|---|---|---|---|
| 5,586,791 A | 12/1996 | Kirchner et al. | |
| 6,447,019 B1* | 9/2002 | Hosono | F16L 37/0915 285/39 X |
| 6,578,879 B2* | 6/2003 | Muto | F16L 37/0915 285/39 X |
| 7,475,913 B2 | 1/2009 | Muto | |
| 7,789,432 B2* | 9/2010 | Dohm | F16L 27/08 285/275 X |
| 7,922,215 B2 | 4/2011 | Salomon-Bahls et al. | |
| 2003/0173779 A1* | 9/2003 | Ezura | F16L 37/0915 |
| 2006/0208743 A1 | 9/2006 | Ishida et al. | |
| 2006/0257203 A1 | 11/2006 | Iida | |
| 2007/0138791 A1* | 6/2007 | Greenberger | F16L 37/0915 285/39 X |
| 2010/0187811 A1* | 7/2010 | Topping | F16L 37/091 |
| 2012/0217742 A1* | 8/2012 | Furuya | F16L 37/0915 |

FOREIGN PATENT DOCUMENTS

| | | |
|---|---|---|
| EP | 0 340 518 A1 | 11/1989 |
| JP | S57-148645 A | 9/1982 |
| JP | S63-201289 U | 12/1988 |
| JP | S63-056395 | 9/1989 |
| JP | H07-277400 A | 10/1995 |
| JP | H08-075070 A | 3/1996 |
| JP | H11-196894 A | 7/1999 |
| JP | 2006-307904 A | 11/2006 |
| JP | 2007-218387 A | 8/2007 |
| WO | 2005/068892 A1 | 7/2005 |
| WO | 2009/040489 A1 | 4/2009 |
| WO | 2010/009942 A1 | 1/2010 |
| WO | 2014/001144 A1 | 1/2014 |

* cited by examiner

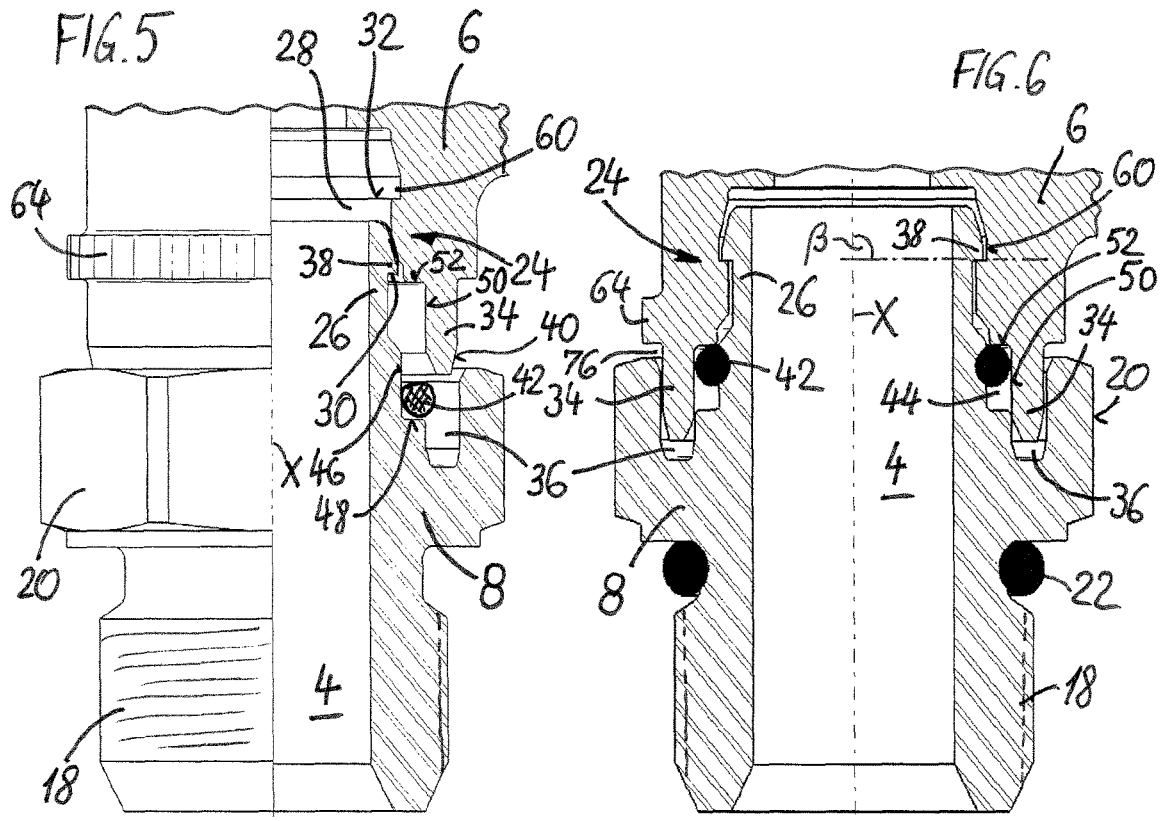
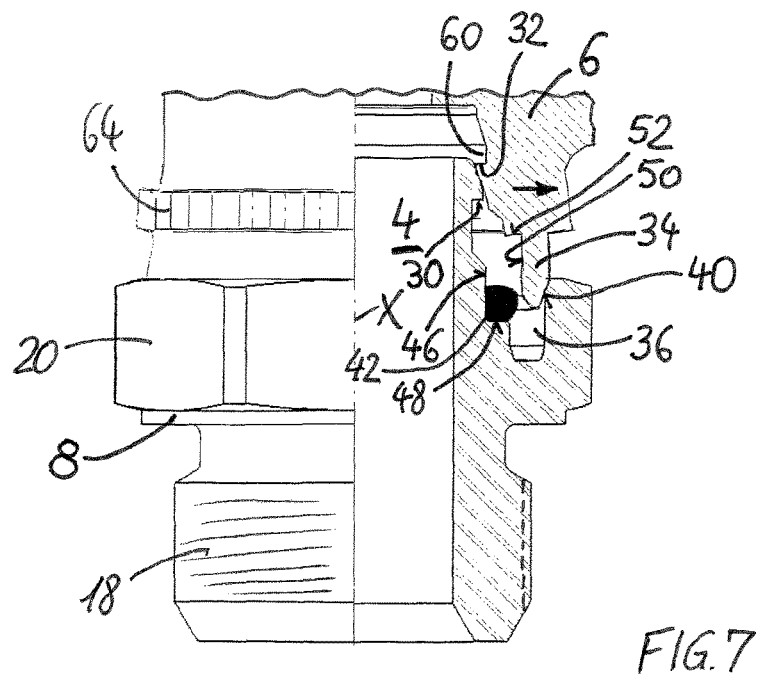

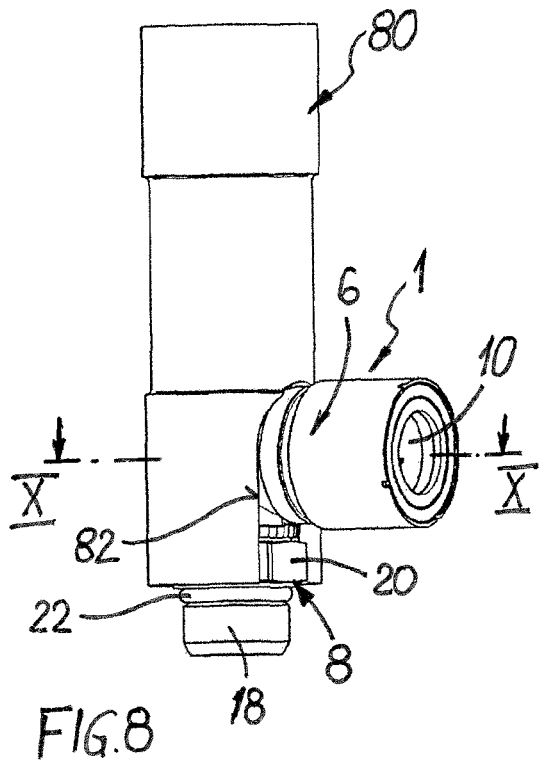
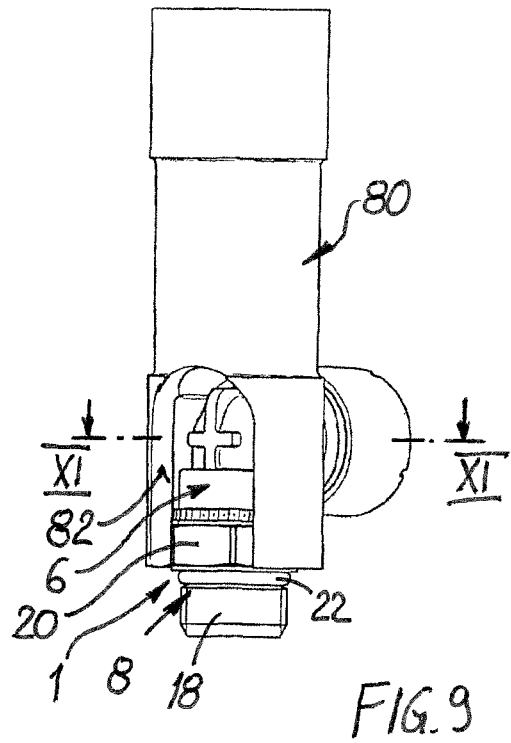
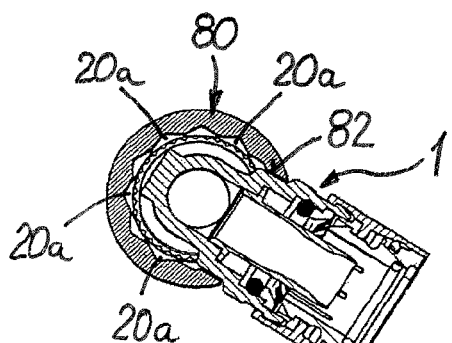
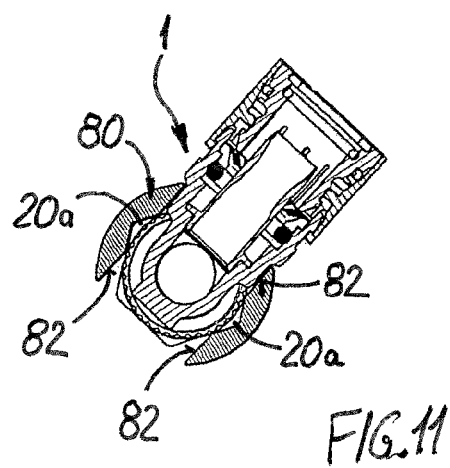

CONNECTING DEVICE FOR MEDIA LINES

The present invention relates to a connecting device for media lines, comprising a housing part which has a through-passage channel and, in two parts, comprises an accommodating part, for the plug-in connection of a media line, and a connection part, for the connection of the housing part to a subassembly or to a further media line, wherein the connecting part consists of metal and is connected to the accommodating part, which consists of plastics material, via a coaxial, rotationally symmetrical plug-in connection with form-fitting latching and with a circumferentially closed linear progression.

Such a connecting device is known from the publication EP 1 697 675 B1. This known connecting device is designed in the form of a plug-in connector, and therefore all that is required is for a media line to be plugged, straightforwardly and quickly, into a plug-in mount of the housing part. The plug-in mount has arranged within it a retaining element, for mechanically arresting the plugged-in line, and a media seal, for sealing the line circumferentially. This known embodiment makes provision, in respect of the form-fitting plug-in connection between the plastics-material accommodating part and the metal connecting part, for the accommodating part to engage in a form-fitting manner, and with latching action in the connecting part. An inner groove-like latching recess of the metal connecting part which is necessary for this purpose is associated with a fairly high level of production outlay because machining is required in the inner region. In addition, the higher inherent stability of the metal connecting part means that the plastics-material accommodating part has to be compressed radially during the plug-in joining operation, which is possible only to a small extent and therefore the radial overlapping of the surfaces involved in the latching operation is limited, as is therefore also the effective retaining force of the latching connection.

Also known are similar embodiments of such connecting devices, see, in this respect, for example the publications WO 2009/040 489 A1 and DE 10 2005 027 816 B4, in which the connecting part engages in the accommodating part by way of an outer circumferential cutting edge. The cutting edge should therefore cut in a form-fitting manner, or at least in a force-fitting manner, into an originally cylindrical inner circumferential surface of the accommodating part. However, this disadvantageously gives rise to the plastics-material accommodating part being subjected permanently to radial prestressing, which, in conjunction with the notch effect caused by the cutting edge, may lead to so-called stress corrosion cracking and thus to damage to, or even failure of, the connecting device.

It is an object of the present invention for a connecting device of the generic type described to be improved in the region of the plug-in connection between the plastics-material accommodating part and the metal connecting part so as to achieve increased operational reliability and improved installation and use properties.

This is achieved in embodiments incorporating the principles of the present invention by providing a connecting device wherein the plug-in extension engages in a form-fitting manner within the plug-in mount.

Accordingly, the invention makes provision for the connecting part to be plugged into a plug-in mount of the accommodating part by way of a plug-in extension, wherein the plug-in extension engages in a form-fitting manner behind a radial undercut surface within the plug-in mount by way of a radially outwardly projecting latching step. This advantageous configuration achieves important advantages.

Thus, and first of all, the radial undercut surface within the plastics-material plug-in mount can be produced relatively straightforwardly just by molding. During the plug-in joining operation, the more dimensionally stable metal plug-in extension expands the plastics-material plug-in mount radially elastically in certain regions. The elasticity of the plastics material can be utilized better for expansion than for radial compression. In this context, it is advantageous if the accommodating part consists of a fiber-reinforced plastics material and predominantly an axial fiber orientation transverse to the direction of expansion of the material is present at least in the region of the plug-in mount. This defined fiber orientation in the latching region of approximately 90° to the direction of expansion can be ensured by suitable measures being taken during the injection-molding operation of the plastics material, in particular by the arrangement and orientation of injection points, the injection speed and shaping of the mold. Suitable parameters can be determined by simulations, for example by a method going by the name of "filling simulation" for simulating injection-molding operations for plastics material in digital prototyping.

It is also advantageous that, according to the invention, in the installed, plugged-in state, the plug-in extension of the connecting part, is arranged with its latching step in a radially stress-free manner in the plug-in mount of the accommodating part. The undercut surface in the plug-in mount, said undercut surface corresponding with the latching step of the plug-in extension, relieves the plastics-material accommodating part of loading, in that the expansion which occurs during the plug-in joining operation is fully reversed. This means that the above-described problem of stress corrosion cracking is completely avoided. In addition, the two parts connected via the plug-in connection according to the invention can advantageously be rotated freely, i.e. with only a small amount of force, about the plug-in axis relative to one another. This is advantageous particularly when one of the two housing parts, in particular the accommodating part, is designed in the form of an angular component, T-shaped component or Y-shaped component or the like, because the rotatability in the region of the plug-in connection can be utilized for the angular rotary orientation of the housing parts. Additional rotation-prevention means are then advantageously provided so as to arrest the angular component in its angular position, once it has been oriented therein. In addition, it is also possible to provide means for securing against axial relative movement.

In a further advantageous configuration of the invention, the accommodating part has an annular collar which is coaxial with the plug-in axis, projects axially at the free end and, for guidance against tilting relative to the plug-in axis, engages in a force-fitting manner in a corresponding recess within the connecting part. This means that the annular collar of the accommodating part and a cylindrical inner circumferential surface within the recess of the connecting part lengthen the effective axial guide length of the interengaging parts of the plug-in connection. The annular collar here preferably engages in an appropriate groove-like recess in the bottom region of the recess of the connecting part by way of its free front end region and therefore force-fitting guiding abutment is also present on the radially inner side of the annular collar. In respect of the radial expansion of the plastics-material accommodating part which occurs during the plug-in joining operation, provision is made here for the annular collar of the accommodating part to have at its free end at least one radially outer sloping introduction surface such that, during the plug-in joining operation, even in the event of radial expansion, the annular collar can in any case be introduced into the corresponding recess of the connecting part. This means that radial overlapping of the end surfaces perpendicular to the plug-in axis is avoided, in that overlapping only occurs in any case in the region of the sloping introduction surface, and therefore the annular collar is always reliably introduced into the recess. On condition that, in the case of an expansion of approximately 5 to 7% in the latching region, there is an increase in circumference in the free end region of the annular collar with a smaller expansion of less than 5 to 7%, the sloping introduction surface is configured such that initial contact of the annular collar in the introduction region of the corresponding recess of the connecting part takes place in any case within the sloping introduction surface. To be on the safe side, the sloping introduction surface is designed such that, in the free end region of the annular collar, it is possible for an expansion of 6 to 10% to occur without the plug-in joining operation being impaired. During the installation operation, the annular collar has its circumference abutting in the recess of the connecting part, as a result of which its yield stress is supported by the connecting part. This means that cracking of the annular collar is reliably avoided during the installation operation. In the installed state, the annular collar is located in a force-fitting manner with only a small amount of joining play, which is present in particular in the form of diameter play ranging from 0.14 to 0.38 mm and/or in the form of radial play ranging from 0.07 to 0.19 mm in the definitively plugged-in state, and without expansion in the recess of the connecting part, wherein preferably a meandering contour forms a labyrinth seal for sealing against the ingress of dirt, moisture, etc. from the outside.

In order to seal the two parts of the housing part circumferentially in relation to one another, an elastic circumferential seal is provided in the region of the plug-in connection, said seal advantageously being arranged in a sealing chamber formed, on the one hand, between a cylindrical outer circumferential surface and a step surface of the connecting part, said step surface projecting radially outwardly from said outer circumferential surface, and, on the other hand, a cylindrical inner circumferential surface and a step surface of the accommodating part, said step surface projecting radially inwardly from said inner circumferential surface. This advantageous configuration means that there are no radial sealing grooves required on either side. This allows straightforward axial installation of the circumferential seal, in particular by positioning it on the cylindrical outer circumferential surface of the plug-in extension of the connecting part. The absence of a sealing groove means that the plastics-material accommodating part with its plug-in mount can be produced straightforwardly by molding, to be precise advantageously with axial demolding in the region of the cylindrical inner circumferential surface, in which case no flash is produced here; rather, a flash-free, circumferentially smooth sealing surface is achieved.

Figure 2:
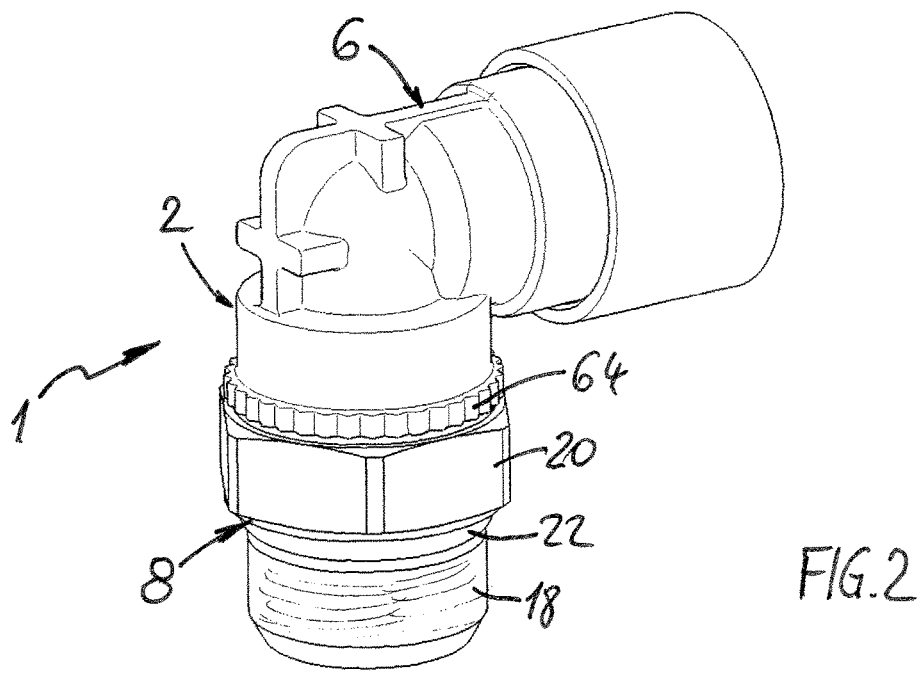
Figure 4:
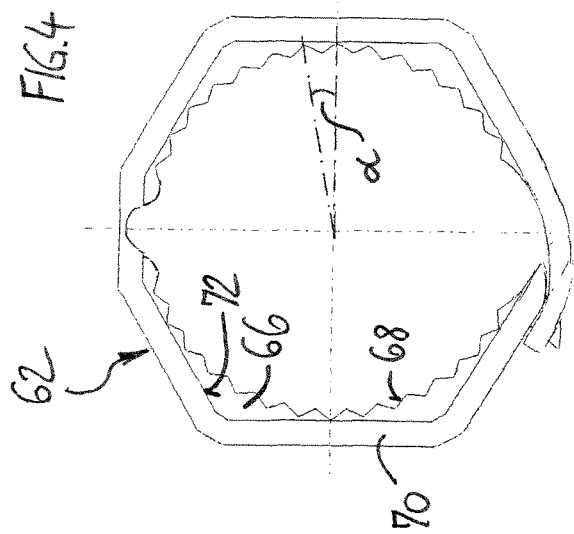
Figure 3:
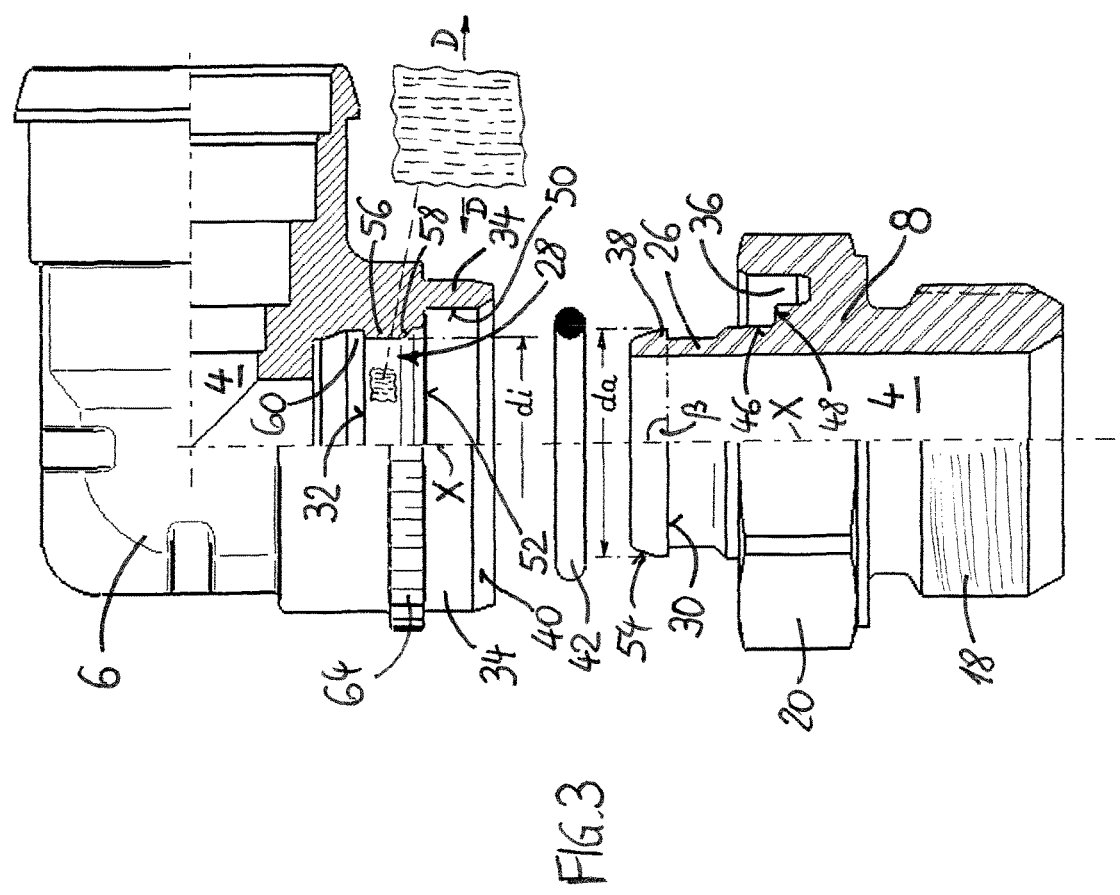

The invention will be explained in more detail hereinbelow, with reference to a preferred exemplary embodiment illustrated in the drawings, in which:

FIG. 1 shows an axial section through a connecting device incorporating the principles of the present invention and configured in the form of an angular connector, FIG. 2 shows a perspective illustration of the connecting device according to FIG. 1 (without a securing clamp according to FIG. 4), FIG. 3 shows an exploded side view of those constituent parts of the connecting device according to FIG. 1, half of each of the constituent parts being illustrated in axial section, FIG. 4 shows a separate illustration of an additional securing clamp, FIG. 5 shows a partial view corresponding to FIGS. 1 and 3 in a state at the beginning of the plug-in joining operation of the plug-in connection, FIG. 6 shows an axial section through the engagement region of the plug-in connection in the assembled, definitively joined state, FIG. 7 shows an illustration analogous to FIG. 5 in an intermediate state during the plug-in joining operation, FIG. 8 shows a reduced-size side view of the connecting device with an additional installation tool in the form of a socket wrench, FIG. 9 shows a view analogous to FIG. 8 with a variant of the socket wrench, FIG. 10 shows a cross section taken generally along plane X-X in FIG. 8, and FIG. 11 shows a cross section taken generally along plane XI-XI in FIG. 9.

In the various figures of the drawing, like parts are always provided with like designations.

In respect of the description which follows, it should be expressly emphasized that the invention is not restricted to the exemplary embodiments, or to all, or a number of, the features of combinations of features described; rather, it is also possible for any individual sub-feature of the/each exemplary embodiment to have inventive importance in its own right, separately from all the other sub-features described in conjunction therewith, and also in combination with any other desired features of another exemplary embodiment as well as independently of the combinations of features and dependency references of the claims.

A connecting device 1 according to the invention serves for connecting a media line (not illustrated), that is to say a pipeline or hose line for flow or pressure media such as liquids and/or gases, to any desired subassembly or to a further line. The connecting device 1, for this purpose, comprises a housing part 2 with a through-passage channel 4 for the respective medium, wherein the housing part 2, in two parts, comprises an accommodating part 6, for the plug-in connection of the respective media line, and a connecting part 8, for the connection of the housing part 2 at the other end.

In the case of the exemplary embodiment illustrated in FIG. 1, the accommodating part 6 has an accommodating opening 10 for the quick, and preferably also releasable, connection of the media line by virtue of one end of the line simply being plugged in. In order to arrest the plugged-in end of the line against being pulled out, the accommodating opening 10 has mounted within it a retaining element 12 which, in the exemplary embodiment illustrated, is designed in the form of a resiliently elastic toothed ring with a plurality of circumferentially distributed retaining teeth which are inclined radially inwardly, and in a sloping manner, in the plug-in direction and thus act in a barb-like manner and with force-fitting and/or form-fitting action against the outer circumferential surface of the end of the line. In order for the line to be released, an axially displaceable release element 13 is provided, it being possible for the latter to deform the retaining element 12 in order to free the line. In order for the plugged-in end of the line to be sealed in the outward direction, at least one circumferential seal 14 is mounted, in addition, within the accommodating opening 10. As is also illustrated, it is additionally possible for a supporting sleeve 16 to be arranged coaxially within the accommodating opening 10 such that, during the plug-in operation, the end of the line can be pushed onto a cylindrical outer surface of the supporting sleeve 16. This means that the plugged-in end of the line is supported radially by the supporting sleeve 16 in relation to the retaining force of the retaining element 12. Further details relating to the line connection are contained in the application DE 20 2012 102 342.3.

It is possible for the connecting part 8—as is illustrated by way of example—to have an externally threaded stub 18 for connection, for example, to a subassembly, wherein a hexagonal protuberance 20 is provided for tightening the screw connection. In order to seal the connecting part 8 in relation to the subassembly, a sealing ring 22 is arranged in the transition region between the externally threaded stub 18 and the hexagonal protuberance 20.

Provision is also made for the connecting part 8 to consist of metal, in particular aluminum or also brass, steel, etc., and to be connected to the accommodating part 6, which consists of plastics material, via a coaxial, rotationally symmetric plug-in connection 24 with form-fitting latching and with a circumferentially closed linear progression. This plug-in connection 24 is therefore a snap-action form-fit connection, said connection being linearly closed and therefore providing support. This achieves a high level of connecting strength.

The invention provides here for the connecting part 8 to be plugged into a plug-in mount 28 of the accommodating part 6 by way of a plug-in extension 26, wherein the plug-in extension 26 engages in a form-fitting manner and with latching action behind a radial undercut surface 32 within the plug-in mount 28 by way of a radially outwardly projecting latching step 30. In this respect, reference is made, in particular, to FIG. 3. For the form fit, the so-called undercut angle β—see FIGS. 1, 3 and 6—is at least 90°, that is to say β≥90°.

In a preferred configuration, the accommodating part 6, following the plug-in mount 28, has an axially projecting annular collar 34 which is coaxial with a plug-in axis X of the plug-in connection 24 and, for guidance purposes, engages in a force-fitting manner in a corresponding axial recess 36 within the connecting part 8. The plug-in connection 24 is configured such that, during the plug-in joining operation—see, in this respect, FIGS. 5 to 7—an outer radial annular crosspiece 38 of the plug-in extension 26 of the connecting part 8, said annular crosspiece having the latching step 30, expands the accommodating part 6 elastically in the inner region of the plug-in mount 28, to be precise preferably by 5 to 7%. This is achieved by way of the diameter ratios. In FIG. 3, the external diameter of the annular crosspiece 38 is depicted by "da" and the minimum internal diameter within the plug-in mount 28 is depicted by "di". Therefore, the necessary amount of percentage diameter expansion is achieved using the equation $$E_d = \frac{d_a - d_i}{d_i}.$$

The expansion created by the respective diameter ratios here is in any case below the elongation at break of the plastics material used.

The annular collar 34 of the accommodating part 6 has at its free end at least one radially outer sloping introduction surface 40 such that, during the plug-in joining operation (FIGS. 5 to 7), even in the event of radial expansion, the annular collar 34 can in any case be introduced into the corresponding recess 36 of the connecting part 8. For illustrative purposes, however, FIG. 7 illustrates the expansion-induced deformation in somewhat exaggerated form.

The accommodating part 6 preferably consists of a fiber-reinforced plastics material. As is indicated, in this respect, in FIG. 3 by an additional enlarged detail and dashed lines, an axial fiber orientation, in other words parallel to the plug-in axis X, is present at least in the region of the plug-in mount 28. Therefore, the fibers embedded in the material, and indicated by dashed lines, are oriented transversely to the direction of expansion (arrows D), which aids the elastic expansion capability.

As can also be seen from FIGS. 1 to 6, an annular gap which is present, in the installed state, between the plug-in extension 26 of the connecting part 8 and the plug-in mount 28 of the accommodating part 6 is sealed in the outward direction via an elastic circumferential seal 42. This circumferential seal 42 is arranged in a sealing chamber 44 which is advantageously formed between, on the one hand, a cylindrical outer circumferential surface 46 and a step surface 48 of the connecting part 8, said step surface projecting radially outwardly from said outer circumferential surface, and, on the other hand, a cylindrical inner circumferential surface 50 and a step surface 52 of the accommodating part 6, said step surface projecting radially inwardly from said inner circumferential surface.

The cylindrical inner circumferential surface 50 is preferably located in the region of the annular collar 34, that is to say the annular collar 34, on its inside, forms the inner circumferential surface 50. This advantageous configuration gives rise to a constructionally straightforward sealing arrangement, which simplifies production and installation. In addition, it is possible for the inner circumferential surface 50 to be demolded axially, and thus without any flash being formed, and therefore, being a smooth sealing surface, it ensures good sealing by virtue of circumferential abutment of the circumferential seal 42.

It is also advantageous if on the annular crosspiece 38, which has the latching step 30, the plug-in extension 26 of the connecting part 8 has an end-side, outer, chamfer-like introduction slope 54 arranged upstream of the latching step 30 (see FIG. 3).

Furthermore, the plug-in mount 28 of the accommodating part 6 has provided within it, in order to form the smallest diameter di, a narrowed portion 56 which, on one side, merges into the undercut surface 32 and, on the other side, has an upstream introduction slope 58.

As can be ascertained, in particular, with reference to the illustration in FIG. 6, in the installed, plugged-in state, the plug-in extension 26 of the connection part 8, in particular in the region of the annular crosspiece 38 and of the latching step 30 is arranged in a radially stress-free manner in the plug-in mount 28 of the accommodating part 6. The annular crosspiece 38 here is seated, with an amount of radial play on the outside, within an inner stress-relief groove 60 of the plug-in mount 28, said groove forming the undercut surface 32.

According to FIGS. 1 to 3, furthermore, provision is preferably made for at least one of the parts 6, 8 of the housing part 2, to be precise, as illustrated, in particular the accommodating part 6, to be designed in the form of an angular component. Since the accommodating part 6 can be rotated about the plug-in axis X relative to the connecting part 8, it is possible to adjust the angular orientation of the accommodating part 6 relative to the connecting part 8. Advantageously provided here are additional means for securing the parts 6, 8 against relative rotation about the plug-in axis X in a certain angular rotary orientation and also preferably against relative axial movement in the installed state. According to FIGS. 1 and 4, as the securing means, an essentially annular clamp element 62 may be installed, or installable, on the outside of a transition region between the connecting part 8 and the accommodating part 6. The clamp element 62, on the one hand, engages in a form-fitting manner in an outer toothing formation 64—see, in particular, FIGS. 2, 3 and 5—of the accommodating part 6 and, on the other hand, engages in a form-fitting manner over the hexagonal protuberance 20 of the connecting part 8. According to FIG. 4, the clamp element 62 can be opened and closed at a circumferential location so that this element, in the open state, can be installed, and removed, with resiliently elastic deformation. For engagement in the outer toothing formation 64, the clamp element 62, according to FIG. 4, has an inner crosspiece 66 with a corresponding mating toothing formation 68. For engaging in a form-fitting manner over the hexagonal protuberance 20 of the connecting part 8, the clamp element 62 has a portion 70 with a corresponding hexagonal socket 72. According to FIG. 4, the toothing formation 64, 68 may be designed with an angular pitch a of, for example, 10°, and this therefore renders stepped angular orientation in steps of in each case 10° possible. In addition, it is also possible for the clamp element 62, according to FIG. 1, to engage, by way of at least one radial securing portion 74, in a circumferential gap 76 formed axially between the accommodating part 6 and connecting part 8 (see, in this respect, FIG. 6), in order to block the parts 6, 8 against axial play-induced movement.

The above-described configuration according to the invention of the connection between the accommodating part 6 and the connecting part 8 renders an advantageously short axial overall length or overall height possible. As is illustrated in this respect, by way of example, in FIGS. 8 to 11, the small overall height—with the connecting device 1 configured in the form of an angular component or T-shaped component—makes it possible to make use, for installation purposes, i.e. for the screw-connection of the connecting part 8, of a socket wrench 80 which can be positioned axially on the hexagonal protuberance 20 of the connecting part 8, in that it has at least one lateral recess 82 which is open peripherally on the end side and can be positioned over, and beyond, the angled outlet of the accommodating part 6. According to FIGS. 9 and 11, the socket wrench 80, for installation purposes using an accommodating part 6 in the form of a T-shaped component (not illustrated), has two diametrically opposite recesses 82. The accommodating part 6 here, in the position region for the or each recess 82 of the socket wrench 80, preferably has outer diameter tapering such that the or each recess 82 of the socket wrench 80 may be narrow enough that, in the case of an angular component—see, in this respect, FIGS. 8 and 10—at least four of the six corners 20a of the hexagonal protuberance 20 can in any case still be accommodated reliably in the socket wrench 80 with just one recess 82 or, in the case of a T-shaped component—see FIGS. 9 and 11—at least two diametrically opposite corners 20a can still be accommodated, on account of the two recesses 82 which are necessary for this purpose.

The invention, rather than being restricted to the exemplary embodiments illustrated and described, also covers all those embodiments which are the equivalents within the context of the invention. It should be expressly emphasized that the exemplary embodiments are not restricted to all the features in combination; rather, it is also possible for any individual sub-feature to have inventive importance in its own right, separately from all the other sub-features. It is also the case that the invention is not as yet restricted to the combination of features defined in the respective independent claim; it may also be defined by any other desired combination of specific features from among all of the individual features disclosed overall. This means that, in practice, virtually any individual feature of the respective independent claim can be omitted and replaced by at least one individual feature disclosed elsewhere in the application. To this extent, the claims should be understood merely as being a first draft for an invention.

We claim:

1. A connecting device for media lines, comprising a housing part of two parts including an accommodating part for the plug-in connection of a media line and a connection part for the connection of the housing part to a subassembly or to a further media line, wherein the connecting part is formed of metal and is connected to the accommodating part which is formed of plastics material, the connecting part being connected to the accommodating part via a coaxial, rotationally symmetrical plug-in connection with form-fitting latching and with a circumferentially closed linear progression,
   wherein the connecting part is plugged into a plug-in mount of the accommodating part by way of a plug-in extension, wherein the plug-in extension engages in a form-fitting manner behind a radial undercut surface within the plug-in mount by way of a radially outwardly projecting latching step,
   wherein the accommodating part has an axially projecting annular collar that is coaxial with a plug-in axis (X) of the plug-in connection and, for guidance purposes, is engaged in a force-fitting manner in a corresponding recess within the connecting part,
   the plug-in extension of the connecting part and the plug-in mount of the accommodating part having an annular gap therebetween that is sealed in a radially outward direction by an elastic circumferential seal arranged in a sealing chamber, the sealing chamber being partly defined by a cylindrical outer circumferential surface of the connecting part and a step surface projecting radially outward from the outer circumferential surface, the sealing chamber also being partly defined by a cylindrical inner circumferential surface of the accommodating part and a step surface projecting radially inwardly from the inner circumferential surface, the step surfaces axially delimiting the sealing chamber, and the inner circumferential surface defining part of the annular collar.

2. The connecting device as claimed in claim 1, wherein the plug-in connection is configured such that, during the plug-in joining operation, an outer radial annular crosspiece of the plug-in extension of the connecting part includes the latching step and expands the accommodating part elastically in the inner region of the plug-in mount by a necessary amount of percentage diameter expansion $E_d$, where $E_d =$ (da−di)/di and, da is the external diameter of the annular crosspiece and di is the minimum internal diameter of the plug-in mount.

3. The connecting device as claimed in claim 2, wherein the annular collar of the accommodating part has at its free end at least one radially outer sloping introduction surface such that, during the plug-in joining operation, the annular collar of the radially expanded accommodating part can be introduced into the corresponding recess of the connecting part.

4. The connecting device according to claim 2, wherein the expanding of the accommodating part is in an amount below a break point of the plastics material.

5. The connecting device according to claim 2, wherein the expanding of the accommodating part is in an amount that is about 5-7% below a break point of the plastics material.

6. The connecting device as claimed in claim 1, wherein the plug-in extension of the connecting part has an end-side, outer chamfered slope arranged upstream of the latching step.

7. The connecting device as claimed in claim 1, wherein the plug-in mount of the accommodating part includes a narrowed portion that merges into the undercut surface on one side and that has an upstream introduction slope formed on another side.

8. The connecting device as claimed in claim 1, wherein the installed state, the plug-in extension of the connecting part is arranged in a radially stress-free manner in the plug-in mount of the accommodating part.

9. The connecting device as claimed in claim 1, wherein at least one of the connecting part and the accommodating part is provided in the form of an angular component, wherein the accommodating part can be rotated about a plug-in axis (X) relative to the connecting part.

10. The connecting device as claimed in claim 9, further comprising an anti-rotation member securing the connecting part and the accommodating part against relative rotation about a plug-in axis (X) in a certain angular rotary orientation and/or against relative axial movement in the installed state.

11. A connecting device for media lines, comprising a housing part of two parts including an accommodating part for the plug-in connection of a media line and a connection part for the connection of the housing part to a subassembly or to a further media line, wherein the connecting part is formed of metal and is connected to the accommodating part which is formed of plastics material, the connecting part being connected to the accommodating part via a coaxial, rotationally symmetrical plug-in connection with form-fitting latching and with a circumferentially closed linear progression,
    wherein the connecting part is plugged into a plug-in mount of the accommodating part by way of a plug-in extension, wherein the plug-in extension engages in a form-fitting manner behind a radial undercut surface within the plug-in mount by way of a radially outwardly projecting latching step,
    wherein the accommodating part has an axially projecting annular collar that is coaxial with a plug-in axis (X) of the plug-in connection and, for guidance purposes, is engaged in a force-fitting manner in a corresponding recess within the connecting part, and
    wherein the accommodating part is formed of a fiber-reinforced plastics material that has an axial fiber orientation transverse to a direction of expansion in at least a region of the plug-in mount.

12. A connecting device for media lines, comprising a housing part of two parts including an accommodating part for the plug-in connection of a media line and a connection part for the connection of the housing part to a subassembly or to a further media line, wherein the connecting part is formed of metal and is connected to the accommodating part which is formed of plastics material, the connecting part being connected to the accommodating part via a coaxial, rotationally symmetrical plug-in connection with form-fitting latching and with a circumferentially closed linear progression,
    wherein the connecting part is plugged into a plug-in mount of the accommodating part by way of a plug-in extension, wherein the plug-in extension engages in a form-fitting manner behind a radial undercut surface within the plug-in mount by way of a radially outwardly projecting latching step,
    wherein the accommodating part has an axially projecting annular collar that is coaxial with a plug-in axis (X) of the plug-in connection and, for guidance purposes, is engaged in a force-fitting manner in a corresponding recess within the connecting part,
    at least one of the connecting part and the accommodating part being provided in the form of an angular component, wherein the accommodating part can be rotated about a plug-in axis (X) relative to the connecting part, and
    an anti-rotation member securing the connecting part and the accommodating part against relative rotation about a plug-in axis (X) in a one angular rotary orientation and/or against relative axial movement in the installed state, wherein the anti-rotation member is a clamp element installed on an outside of a transition region between the connecting part and the accommodating part, wherein the clamp element engages an outer toothing formation of the accommodating part in a form-fitting engagement and engages a hexagonal protuberance of the connecting part in a form-fitting engagement.

13. The connecting device as claims in claim 12, wherein the clamp element includes at least one radial securing portion extending into a circumferential gap formed axially between the accommodating part and the connecting part.

\* \* \* \* \*